United States Patent
Schoen et al.

(10) Patent No.: US 10,017,274 B2
(45) Date of Patent: Jul. 10, 2018

(54) EXTERIOR HELICOPTER LIGHT UNIT AND METHOD OF OPERATING AN EXTERIOR HELICOPTER LIGHT UNIT

(71) Applicant: Goodrich Lighting Systems GmbH, Lippstadt (DE)

(72) Inventors: Christian Schoen, Mainz (DE); Andre Hessling-von Heimendahl, Koblenz (DE); Anil Kumar Jha, Lippstadt (DE); Christo Tsibadze, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/210,314

(22) Filed: Jul. 14, 2016

(65) Prior Publication Data

US 2017/0015437 A1 Jan. 19, 2017

(30) Foreign Application Priority Data

Jul. 17, 2015 (EP) ..................................... 15177240

(51) Int. Cl.
*B64D 47/04* (2006.01)
*B64D 47/02* (2006.01)
(Continued)

(52) U.S. Cl.
CPC ............. *B64D 47/02* (2013.01); *B64D 47/04* (2013.01); *F21V 5/04* (2013.01); *F21V 7/00* (2013.01);
(Continued)

(58) Field of Classification Search
None
See application file for complete search history.

(56) References Cited

U.S. PATENT DOCUMENTS 2,712,060 A   6/1955 Johnson
3,569,690 A   3/1971 Nelson
(Continued)

FOREIGN PATENT DOCUMENTS

DE   102012001017 A1   7/2013
EP        2327629 A1   6/2011
(Continued)

OTHER PUBLICATIONS

Wojciech Mocko; Piotr Kazmierczak; Malgorzata Kalisz, "Przeglad Elektrotechniczny ISSN 0033-2097, R. 89 NR 1A/2013".*

(Continued)

*Primary Examiner* — Douglas W Owens
*Assistant Examiner* — Jianzi Chen
(74) *Attorney, Agent, or Firm* — Cantor Colburn LLP

(57) ABSTRACT

An exterior helicopter light unit (2) with a dynamic output light intensity distribution includes a plurality of LEDs (30), and an optical system (32) for shaping the output light intensity distribution from light emitted by the plurality of LEDs (30), wherein each of the plurality of LEDs (30) contributes to the output light intensity distribution in an LED-specific output direction region, wherein at least a portion of the plurality of LEDs (30) are individually dimmable, with a level of dimming for each of said portion of the plurality of LEDs (30) in operation being set depending on a distance of the exterior helicopter light unit (2) to ground (200) in the respective LED-specific output direction region.

14 Claims, 8 Drawing Sheets

(51) Int. Cl.
*F21V 5/04* (2006.01)
*F21V 7/00* (2006.01)
*H05B 33/08* (2006.01)
*H05B 37/02* (2006.01)
*F21Y 115/10* (2016.01)

(52) U.S. Cl.
CPC ..... *H05B 33/0854* (2013.01); *H05B 37/0227* (2013.01); *B64D 2203/00* (2013.01); *F21Y 2115/10* (2016.08)

(56) References Cited

U.S. PATENT DOCUMENTS

| | | |
|---|---|---|
| 4,316,241 A | 2/1982 | Gulliksen |
| 5,315,296 A | 5/1994 | Kaiser et al. |
| 2007/0147055 A1 | 6/2007 | Komatsu |
| 2011/0235349 A1 | 9/2011 | Nakaya et al. |

FOREIGN PATENT DOCUMENTS

| | | | |
|---|---|---|---|
| EP | 2700538 A1 | 2/2014 | |
| WO | WO 2009022165 A3 * | 12/2009 | ............. B64D 47/04 |

OTHER PUBLICATIONS

European Search Report for Application No. 15177240.7-1754 dated Jul. 12, 2015; 7 Pages.

* cited by examiner

EXTERIOR HELICOPTER LIGHT UNIT AND METHOD OF OPERATING AN EXTERIOR HELICOPTER LIGHT UNIT

FOREIGN PRIORITY

This application claims priority to European Patent Application No. 15 177 240.7 filed Jul. 17, 2015, the entire contents of which is incorporated herein by reference.

TECHNICAL FIELD

The present invention is in the field of exterior helicopter lighting. In particular, it is in the field of helicopter light units that are used for illuminating the helicopter environment when flying close to ground, sometimes referred to as helicopter headlamps or flood lights.

BACKGROUND

Most helicopters have headlamps. Such headlamps provide for an illumination of the helicopter environment in the pilot's field of view. In particular, such headlamps are provided for making the pilot aware of the ground conditions as well as of potentially dangerous obstacles, such as power lines or trees, located close to the helicopter. These helicopter headlamps are mainly used for helicopter landing operations and for helicopter flights in very close vicinity to the ground. Previous helicopter headlamps are not satisfactory in that the reflections from the illuminated area are sometimes blinding and/or distracting to the pilot, such that potentially dangerous obstacles may remain unnoticed.

Accordingly, it would be beneficial to provide an exterior helicopter light unit that allows for the pilot to have an improved awareness of its surroundings.

SUMMARY

Exemplary embodiments of the invention include an exterior helicopter light unit with a dynamic output light intensity distribution, comprising a plurality of LEDs, and an optical system for shaping the output light intensity distribution from light emitted by the plurality of LEDs, wherein each of the plurality of LEDs contributes to the output light intensity distribution in an LED-specific output direction region, wherein at least a portion of the plurality of LEDs are individually dimmable, with a level of dimming for each of said portion of the plurality of LEDs in operation being set depending on a distance of the exterior helicopter light unit to ground in the respective LED-specific output direction region. The exterior helicopter light unit may be a helicopter headlamp.

Exemplary embodiments of the invention allow for a better pilot awareness of the surroundings, because the output light intensity distribution of the exterior helicopter light unit is adjusted to the distance to surrounding objects. The human eye tends to adapt to the brightest illumination present in the field of view. Accordingly, in previous approaches for exterior helicopter light units that provided a uniform light intensity distribution for the entire opening angle of the light unit, it was often the case that some structures, such as the ground close to the helicopter, were illuminated in a brighter manner as compared to objects being farther removed, such as a tree or mountain in the forward direction of the helicopter. Due to this brighter illumination of the ground close to the helicopter and the human eyes' tendency to adapt to the brightest illumination in its field of view, situations have occurred where the pilot was well aware of the ground structure right in front of the helicopter, but failed to see obstacles that are less brightly illuminated. By making the light output of the exterior helicopter light unit in various directions dependant on the distance to ground in those directions and by setting an according level of dimming for the LEDs emitting light in those directions, the exterior helicopter light unit allows for a more uniform illumination of the helicopter surroundings. This in turn allows for the pilot to be aware of the entire surroundings in a more uniform manner and to be not as easily distracted by a particular region of its surroundings due to a higher illumination. In short, by providing a plurality of individually dimmable LEDs, each having different directivity within the exterior helicopter light unit, and by dimming each of the plurality of LEDs depending on the distance to ground in the LED-specific output direction region, a more uniform illumination of the helicopter surroundings and an increased awareness for the surroundings can be achieved for the pilot.

The exterior helicopter light unit may comprise a control unit that is coupled to the plurality of LEDs and that controls the level of dimming of the individually dimmable LEDs. In particular, the control unit may receive information about and/or determine the distance of the exterior helicopter light unit to ground in the respective LED-specific output direction region for each of the individually dimmable LEDs. It may further set the level of dimming for the individually dimmable LEDs and operate the individual dimmable LEDs accordingly.

The term ground refers to all structures and objects that are part of the helicopter environment and that are static as compared to the moving helicopter. In this manner, the term ground includes objects such as houses, trees and power lines that form part of the terrain that the helicopter is flying over. Further, the term ground also includes structures like hills and mountains that may not extend beneath the helicopter but that may rise in front of it.

At least a portion of the plurality of LEDs are individually dimmable. In particular, those LEDs may be individually dimmable that illuminate the ground beneath the helicopter, when the ground is a flat surface. In this way, the most common disturbing reflections, stemming from the ground area close to the helicopter, may be reduced by dimming. However, it is also possible that all of the plurality of LEDs are individually dimmable. In this way, less common, but also possibly disturbing reflections from objects in front of the helicopter, such as trees or mountain walls, may also be reduced via dimming.

It is not necessary that each of said portion of individually dimmable LEDs experiences some form of dimming at any given point in time. In particular, depending on the distance to ground in the respective LED-specific output direction region, a given individually dimmable LED may be operated in its nominal operating mode, i.e. in its un-dimmed operating mode. However, for each of the individual dimmable LEDs, a momentary determination is made whether and which level of dimming is appropriate. For each of the individually dimmable LEDs, there may be various flight scenarios where the LED is dimmed as compared to its nominal operation.

The term LED-specific output direction region refers to the portion of the output light intensity distribution that a specific LED contributes to. Each of the plurality of LEDs does not contribute to all angles of the output light intensity distribution. Accordingly, each of the plurality of LEDs has a certain directivity within the output light intensity distribution. However, the contribution of each of the plurality of LEDs within the output light intensity distribution is not restricted to one particular direction, i.e. it is not limited to a particular geometric direction. Rather, each of the plurality of LEDs contributes to the output light intensity distribution over an angular range, in particular over a narrow angular range, thus contributing to the output light intensity distribution over an LED-specific region. This combination of directivity and contribution to the output light intensity distribution over an extended region is meant by the term LED-specific output direction region. The output direction region may also be defined via a main light emission direction of a particular LED and an angular range around said main light emission direction that is also illuminated with the light stemming from that particular LED. The distance to ground in the respective LED-specific output direction region may be determined as the distance to ground in the main light emission direction of the specific LED or may be determined as the distance to ground in any direction covered by the LED-specific output direction region.

According to a further embodiment, the exterior helicopter light unit is configured to operate each of said portion of the plurality of LEDs with a dimmed light intensity when the distance of the exterior helicopter light unit to ground in the respective LED-specific output direction region is below a predetermined threshold distance. In other words, when the light from a specific LED has a travel path to ground that is shorter in length than the predetermined threshold distance, this particular LED is operated with a dimmed light intensity. In this way, disturbing reflections that are generated by objects being closer to the helicopter than the predetermined threshold distance are reduced or even eliminated via the dimming of those LEDs responsible for generating the disturbing reflections.

According to a further embodiment, the exterior helicopter light unit is configured to set the dimmed light intensity as a function of a nominal light intensity and the distance of the exterior helicopter light unit to ground in the respective LED-specific output direction region. The momentary distance to ground in the respective LED-specific output direction region is taken into account for finding a suitable level of dimming. By establishing a relation between the momentary distance to ground and the nominal light intensity, an appropriately dimmed light intensity can be calculated with little complexity, leading to an overall conveniently implementable exterior helicopter light unit. The term nominal light intensity refers to the light intensity that the plurality of LEDs are operated at, when no part of the helicopter surroundings are closer to the helicopter than the predetermined threshold distance.

According to a further embodiment, the dimmed light intensity $I_{dim}$ is between $0.8*(I_{nom}*(d/d_{th})2)$ and $1.2*(I_{nom}*(d/d_{th})2)$, in particular between $0.9*(I_{nom}*(d/d_{th})2)$ and $1.1*(I_{nom}*(d/d_{th})2)$, more in particular at $(I_{nom}*(d/d_{th})2)$, with $I_{nom}$ denoting the nominal light intensity and d denoting the distance of the exterior helicopter light unit to ground in the respective LED-specific output direction region. In this way, the dimmed light intensity is set at or close to a value that takes into account the functional relationship between illuminance of an area and distance to the light source. As the illuminance decreases according to a quadratic function, increasing the light intensity according to a quadratic function allows for nearly or exactly balancing out the illumination differences arising from different distances to ground. In this way, a nearly or fully uniform illumination of the helicopter surroundings may be achieved.

According to a further embodiment, the exterior helicopter light unit is configured to operate the plurality of LEDs with a nominal light intensity when the distance of the exterior helicopter light unit to ground in the respective LED-specific output direction region is above the predetermined threshold distance. In this way, a uniform light intensity distribution is provided in those directions of the helicopter environment where no ground structure/object is closer to the helicopter than the predetermined threshold distance. This is based on the rationale that the ground structures/objects that are farther away than the predetermined threshold distance do generally not give rise to disturbing reflections. By providing a uniform illumination in those regions where no ground structures are present and by dimming down those regions where ground structures are present, a safety sphere effect can be achieved where the illuminance is adapted to the hypothetical case of all ground structures being distanced from the helicopter at least at the predetermined threshold distance.

According to a further embodiment, the nominal light intensity is between 4 kcd and 50 kcd, in particular between 10 kcd and 30 kcd, more in particular around 20 kcd. In this way, the exterior helicopter light unit provides sufficient illumination to be used as a helicopter headlamp according to common headlamp requirements. The nominal light intensity may be provided by a single LED, in case only one LED is used for a given angular region of the output light intensity distribution, or may be provided by a combination of multiple LEDs, in case multiple LEDs contribute to the output light intensity distribution in the given angular region.

According to a further embodiment, the predetermined threshold value is between 10 m and 30 m, in particular between 15 m and 25 m, more in particular about 20 m. In this way, it is ensured that a safe perception of the environment is ensured in the close vicinity of the helicopter, where the non-awareness of a potentially dangerous obstacle is highly safety-critical.

According to a further embodiment, the exterior helicopter light unit further comprises a distance sensor, configured to sense, for at least some of said portion of plurality of LEDs, the distance of the exterior helicopter light unit to ground in the respective LED-specific output direction region. In this way, an actually measured parameter can be used as distance to ground, making a highly accurate adaption of the output light intensity distribution possible with respect to the helicopter surroundings. The actual distances can be measured for all of said portion of the plurality of LEDs. However, it is also possible to sense the distance for a subset of said portion of the plurality of LEDs, with the other distances being determinated via interpolation and/or extrapolation.

In addition/in the alternative, the exterior helicopter light unit further comprises a signal input for receiving terrain information from an external service, such as from an external terrain radar. On the basis of this information, the exterior helicopter light unit may be configured to determine, for each of said portion of the plurality of LEDs, the distance of the exterior helicopter light unit to ground in the respective LED-specific output direction region. In this way, the exterior helicopter light unit may rely on information that is readily available in some other device in the helicopter, such as in the helicopter board computer, for selecting the appropriate level of dimming. Accordingly, the exterior helicopter light unit may be operated without requiring an additional distance sensor or the like.

According to an alternative embodiment, the exterior helicopter light unit is configured to determine, for each of said portion of the plurality of LEDs, the distance of the exterior helicopter light unit to ground in the respective LED-specific output direction region on the basis of a height above ground of the exterior helicopter light unit and an angle between a vertical direction and the respective LED-specific output direction region. In this way, an estimate of the distance to ground in the respective LED-specific output direction region may be determined from trigonometric relations. This leads to an exterior helicopter light unit with very low complexity, because only the height of the light unit above ground is required as a momentary input, while the angles of the respective LED-specific output direction regions with respect to the vertical direction can be pre-stored in a memory unit of the exterior helicopter light unit. While having low complexity, this set-up may not be as accurate as above described embodiments, because the trigonometric relations do not account for an uneven ground surface or other ground objects like trees or houses.

According to a further embodiment, the exterior helicopter light unit has a total horizontal opening angle of between 250° and 300°, in particular of about 270°. In this way, a wide region of awareness, corresponding to the pilot's field of view, is made possible via the illumination by the exterior helicopter light unit.

According to a further embodiment, the exterior helicopter light unit has a total vertical opening angle of between 80° and 120°, in particular of between 90° and 110°. This again allows for the pilot to have a large degree of awareness for the helicopter surroundings, also in a vertical dimension.

According to a further embodiment, each of the LED-specific output direction regions has an individual opening angle of between 5° and 10°. The term individual opening angle may relate to the dimension of smallest extension of the LED-specific output direction region. It is also possible that each of the LED-specific output direction regions has an individual opening angle of between 5° and 10° in both the vertical dimension and the horizontal dimension. Such an individual opening angle of between 5° and 10° has been found to be a good compromise between providing a granular adaption of the output light intensity distribution, depending on the distance of the helicopter to the ground structure surrounding it, and a manageable number of LEDs and associated optical structures.

Exemplary embodiments of the invention further include a helicopter, comprising an exterior helicopter light unit according to any of the preceeding claims, arranged as a headlamp in a front portion in the helicopter. The modifications, additional features and effects discussed above with respect to the exterior helicopter light unit are equally applicable to the helicopter.

According to a further embodiment, the exterior helicopter light unit has a total vertical opening angle of between 80° and 120°, in particular of between 90° and 110°, and the exterior helicopter light unit is arranged at the helicopter in such a way that light emitted over the total vertical opening angle illuminates an area adjacent to a non-illuminated downwards region, the non-illuminated downwards region being defined by a threshold angle with respect to a downwards direction from the exterior helicopter light unit, with the threshold angle being between 10° and 30°. In other words, in a straight-down direction from the exterior helicopter light unit, no illumination takes place. In particular, a cone around the straight-down direction is left non-illuminated, with the threshold angle defining the extension of said cone. In this way, no power is wasted for the straight-down direction, which cannot be seen by the helicopter pilots. An overall energy-efficient exterior helicopter light unit is provided.

Exemplary embodiments of the invention further include a method of operating an exterior helicopter light unit with a dynamic output light intensity distribution, having a plurality of LEDs and an optical system for shaping the output light intensity distribution from light emitted by the plurality of LEDs, wherein each of the plurality of LEDs contributes to the output light intensity distribution in an LED-specific output direction region. The method comprises the steps of determining, for each of at least a portion of the plurality of LEDs, a distance of the exterior helicopter light unit to ground in the respective LED-specific output direction region; setting, for each of said portion of the plurality of LEDs, a level of dimming depending on the distance of the exterior helicopter light unit to ground in the respective LED-specific output direction region; and operating each of said portion of the plurality of LEDs in accordance with the respective level of dimming. The modifications, additional features and effects, described above with respect to the exterior helicopter light unit, apply to the method of operating an exterior helicopter light unit in an analogous manner. Method steps analogous to the modifications and additional features described above are explicitly disclosed herewith.

According to a further embodiment, the level of dimming of each of said portion of the plurality of LEDs is set in such a way that a helicopter environment is illuminated in a substantially uniform manner. In this way, no areas of bright illumination distract the pilot, leading to an improved overall awareness of the helicopter surroundings.

BRIEF DESCRIPTION OF THE DRAWINGS

Further exemplary embodiments of the invention are described with respect to the accompanying Figures, wherein.

DETAILED DESCRIPTION

Figure 1:
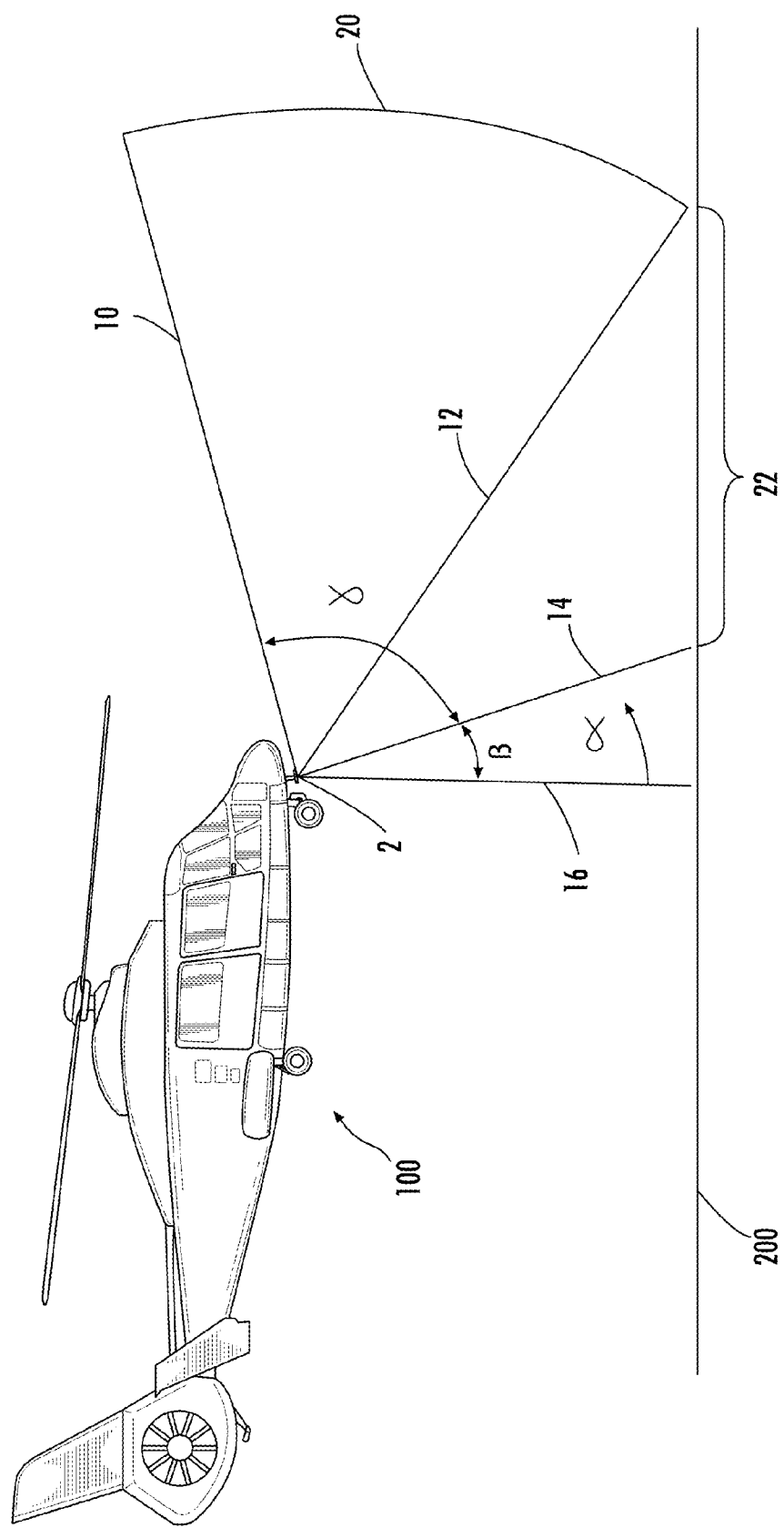
FIG. 1 shows an exemplary helicopter, equipped with an exterior helicopter light unit in accordance with an exemplary embodiment of the invention.

FIG. 1 shows an exemplary helicopter 100, equipped with an exterior helicopter light unit 2 in accordance with an exemplary embodiment of the invention, in a side view. The exterior helicopter light unit 2 is arranged in a bottom front portion of the helicopter 100. It is directed forwards for illuminating the pilot's field of view and can also be referred to as a helicopter headlamp. The helicopter 100 is depicted as flying above ground 200 with low altitude.

The exterior helicopter light unit 2 has a plurality of LEDs and an optical system. In particular, in the exemplary embodiment of FIG. 1, the exterior helicopter light unit has 300 LEDs. Each LED cooperates with the optical system of the exterior helicopter light unit 2 in such a way that the light output by the LED in question is bundled into a narrow beam with an opening angle of about 10°. The light of each LED illuminates a different region of the surroundings of the helicopter 100. In other words, each LED contributes to the total output light intensity distribution in an LED-specific output direction region. The 300 LEDs are able to cover a vertical opening angle of about 95° and a horizontal opening angle of about 270°. It is pointed out that a lower or higher number of LEDs is also possible. In particular, it is possible to provide between 300 and 1000 LEDs in the exterior helicopter light unit 2. Exemplary implementations of directing the light output of individual LEDs into different directions will be explained below.

As explained above, the vertical opening angle of the exterior helicopter light unit 2 is about 95°, indicated by symbol $\gamma$ in FIG. 1. With light being emitted within this vertical opening angle $\gamma$, the exterior helicopter light unit 2 illuminates a section 22 of the ground 200 and an imaginary spherical screen, illustrated by circular line 20, ahead of the helicopter 100. The light emitted towards the imaginary spherical screen in reality provides for a far-field illumination of the free space ahead of the helicopter.

The illuminated area can also be described in terms of an angle $\alpha$, measured counter-clockwise with respect to a straight-down direction 16. The straight-down direction 16 is the vertical connection between the exterior helicopter light unit 2 and ground 200. Starting from the straight-down direction 16, a non-illuminated downwards region is present for angle $\beta$, with $\beta$ being 20° in the exemplary embodiment of FIG. 1. In other words, the illuminated region starts at $\alpha=\beta=20°$ in the exemplary embodiment of FIG. 1. The lower edge of the illuminated region is referenced with line 14 in FIG. 1. The angle $\beta$ is also referred to as threshold angle of a non-illuminated downwards region. The illuminated region ends at $\alpha=\beta+\gamma=115°$ in the exemplary embodiment of FIG. 1. The upper edge of the illuminated region is referenced with line 10 in FIG. 1.

As stated above, the circular line 20 represents an imaginary spherical screen, which is illuminated by the exterior helicopter light unit. It is apparent that, in the absence of any objects being present along line 20, the illumination does not stop at said line 20. Rather, the light propagates on from this imaginary border. However, the imaginary spherical screen, illustrated by circular line 20, is an illustrative way of showing and explaining the nature of the light intensity distribution, as emitted by the exterior helicopter light unit 2. Accordingly, for the purpose of explaining the output light intensity distribution, it can be assumed that the imaginary spherical screen is disposed along line 20, which will be illustrated more in FIG. 3. With line 20 being circular around the exterior helicopter light unit 2, line 10, which represents the upper edge of the region illuminated by the exterior helicopter light unit 2, has the same length as line 12. Line 12, which is between the upper edge of the illuminated region and the lower edge of the illuminated region marks the direction in which the imaginary spherical screen hits the ground 200. This direction is referred to as a cross-over direction or cross-over point of the output light intensity distribution, as will be explained below. In the exemplary embodiment of FIG. 1, the length of lines 10 and 12 is 20 m.

The exterior helicopter light unit 2 has a dynamic output light intensity distribution. The momentary output light intensity distribution of the exterior helicopter light unit 2 aims at providing a uniform illumination of the ground section 22 and the imaginary spherical screen, illustrated by circular line 20. As the ground section 22 is closer to the exterior helicopter light unit 2 than the imaginary spherical screen along line 20, the light intensity emitted by the exterior helicopter light unit 2 towards the ground section 22 is lower than towards the imaginary spherical screen. With all points along line 20 having the same distance to the exterior helicopter light unit 2, the exterior helicopter light unit 2 emits a nominal light intensity Inom towards the imaginary spherical screen, illustrated by line 20, i.e. in the angular region between the upper edge of the output light intensity distribution, illustrated by line 10, and the cross-over direction, illustrated by line 12.

The nominal light intensity Inom may be such that the illuminance of the imaginary screen along line 20 would be between 10 lx and 160 lx, in particular around 80 lx. The light intensity between the lower edge of the illuminated region, illustrated by line 14, and the cross-over direction, illustrated by line 12, is dimmed in such a manner that the illumination along the ground section 22 at least substantially matches the illumination of the imaginary screen along line 20.

Figure 2:
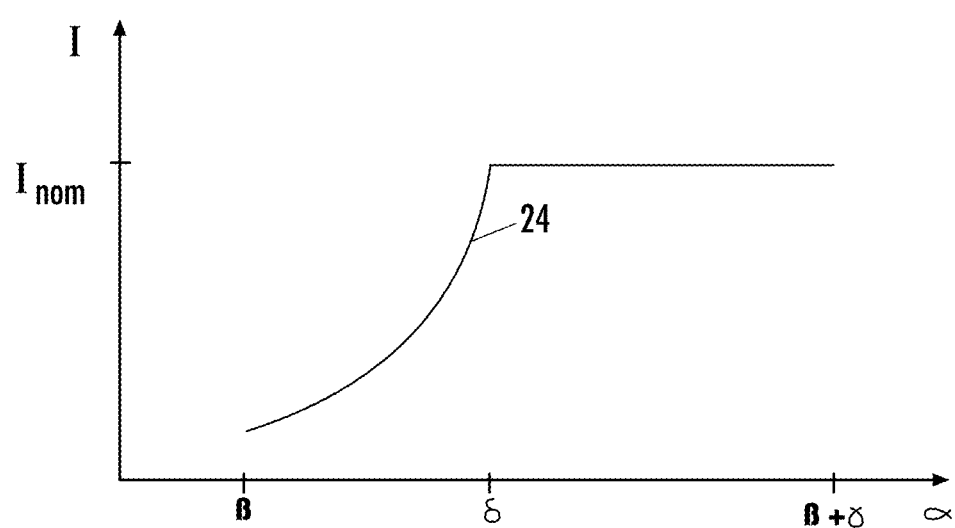
FIG. 2 shows a momentary output light intensity distribution of the exterior helicopter light unit of FIG. 1.

With respect to FIG. 2, a function of the light intensity I is shown with respect to the angle $\alpha$. As explained above, the output light intensity distribution of the exterior helicopter light unit 2 starts at angle $\beta$ and ends at angle $\beta+\gamma$. The depicted output light intensity distribution has two distinct portions, one between angles $\beta$ and $\delta$ and the other between angles $\delta$ and $\beta+\gamma$. The angle $\delta$ corresponds to the cross-over direction 12, depicted in FIG. 1. As explained above, the output light intensity distribution is constant at the nominal light intensity Inom for the angles between $\delta$ and $\beta+\gamma$. For the angular range between $\beta$ and $\delta$, different levels of dimming are present in the output light intensity distribution, depending on the distance to ground at the angle $\alpha$. In the exemplary embodiment of FIG. 2, the output light intensity distribution between angles $\beta$ and $\delta$ follows a quadratic function that can be written as I=Inom*((h/cos(a))2/dth2), with h referring to the height above ground of the helicopter 100 and with dth referring to the distance of the imaginary spherical screen to the exterior helicopter light unit 2, i.e. the distance of line 20 to the exterior helicopter light unit 2, also referred to as threshold distance.

The output light intensity distribution I may also follow the formula I=Inom*(d2/dth2), with d referring to the distance towards ground for angle $\alpha$. This way of determining the light intensity per angle $\alpha$ may lead to an even more uniform illumination of the helicopter surroundings, because the actual distance to ground d takes into account an uneven ground or the presence of ground objects, such as houses or trees. In contrast thereto, the determination of the light intensity via the height of the exterior helicopter light unit over ground requires only one input parameter, namely the height h, and may thus be implemented in a less complex manner.

The output light intensity distribution of FIG. 2 is the output light intensity distribution of the exterior helicopter light unit 2 as a whole. It is pointed out that this output light intensity distribution is the sum of the output light intensity distributions of the individual LEDs, with each LED contributing thereto in a respective LED-specific output direction region. With the LED-specific output direction regions being known for the LEDs, the curve of FIG. 2 may be used for determining a level of dimming for each of the plurality of LEDs, depending on which angle α the respective LED-specific output direction region has. It is further pointed out that the curve of FIG. 2 may be an ideal curve and that the operation of the plurality of LEDs may lead to an output light intensity distribution that approaches, but does not reach this ideal curve. In particular, the actual output light intensity distribution of the exterior helicopter light unit 2 may be within +/−20% of the curve of FIG. 2, in particular within +/−10%. It is further pointed out that the curve of FIG. 2 is one exemplary output light intensity distribution for a particular operating condition and that the output light intensity distribution is adapted in a dynamic manner, depending on the distance to ground.

Figure 3A:
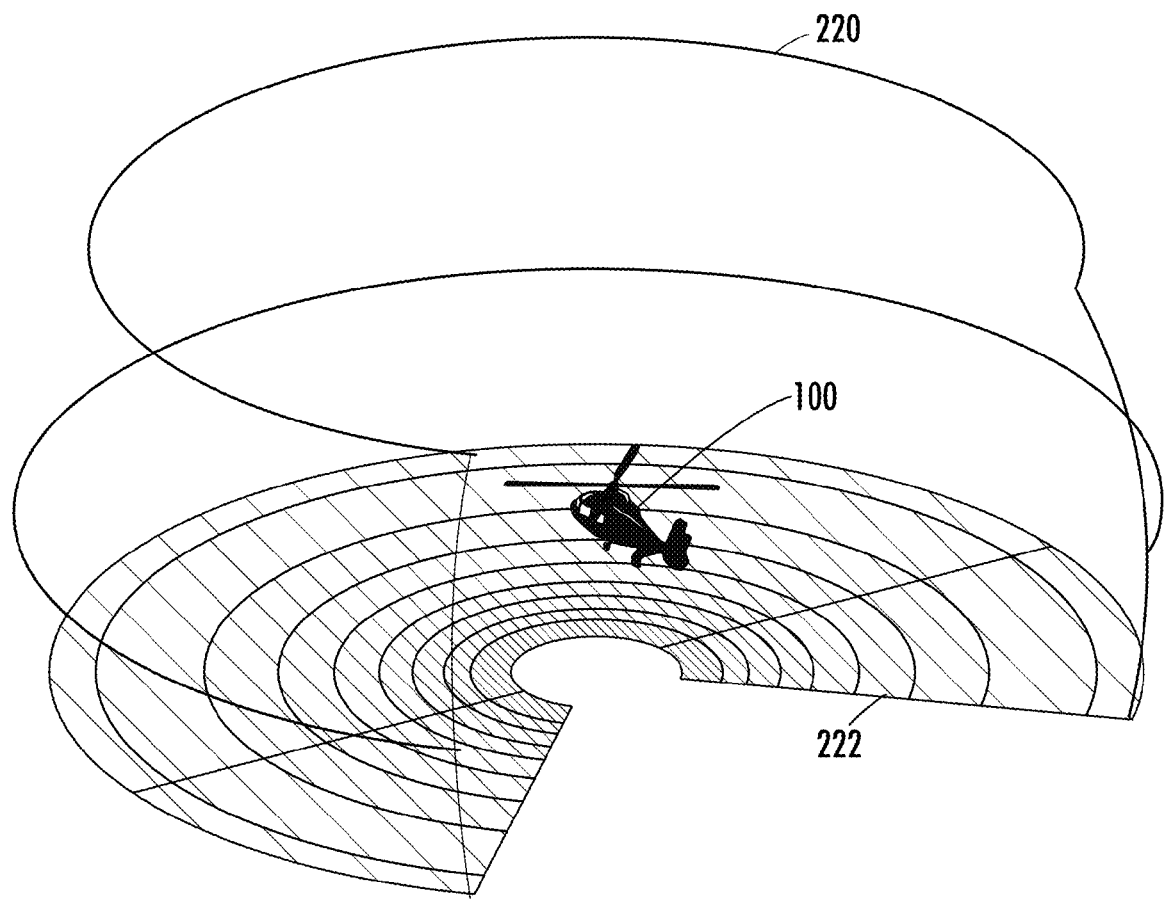
FIG. 3A-FIG. 3B show a three-dimensional illustration of the output light intensity distribution in the frame of reference of the helicopter of FIG. 1.
Figure 3B:
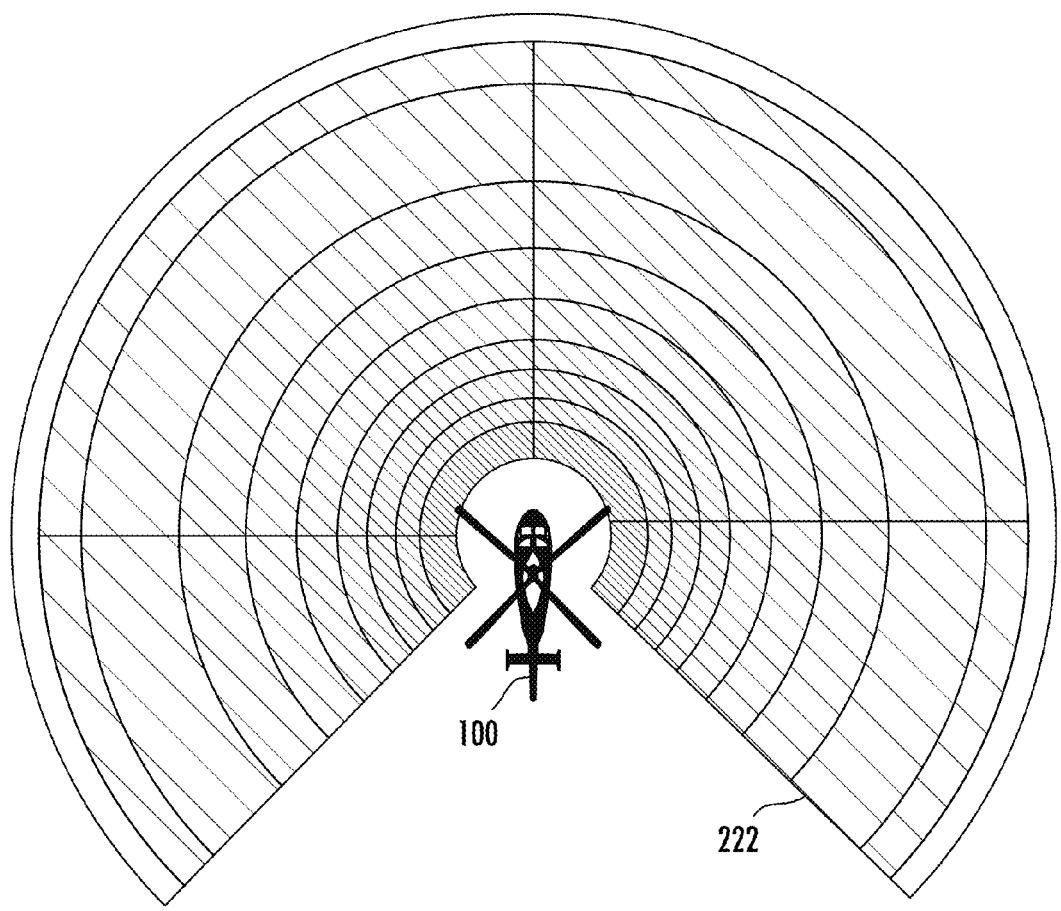

FIG. 3 shows an exemplary illumination of a ground area 222 and an imaginary spherical screen 220 in a three-dimensional, perspective view in relation to the helicopter 100. The ground area 222 and the imaginary spherical screen 220 are structures that result from a rotation of the ground section 22 and line 20, shown in FIG. 1, around the exterior helicopter light unit 2. The vertical opening angle of the output light intensity distribution corresponds to the angle γ, introduced and described with respect to FIG. 1 above. The horizontal opening angle of the output light intensity distribution is about 270°. The different shades of the ground area 222 of FIG. 3a illustrate the different levels of dimming of the LEDs emitting light into the different portions of the ground area 222, i.e. they illustrate the different levels of emitted light intensity. The darker an area is shown, the lower the light intensity in the corresponding angular region. The different levels of light intensity generally correspond to the light intensity distribution of FIG. 2. By using such a light intensity distribution, a roughly uniform illumination of the ground area 222 and the imaginary spherical screen 220 can be achieved. A safety sphere around the pilot can be established. FIG. 3b shows the helicopter 100 as well as the light intensity distribution of the exterior helicopter light unit towards the ground area 222 of FIG. 3a in a top view. It can be seen that the light intensity increases for angular regions that correspond to parts of the ground area 222 that are farther removed from the helicopter 100.

Figure 4A:
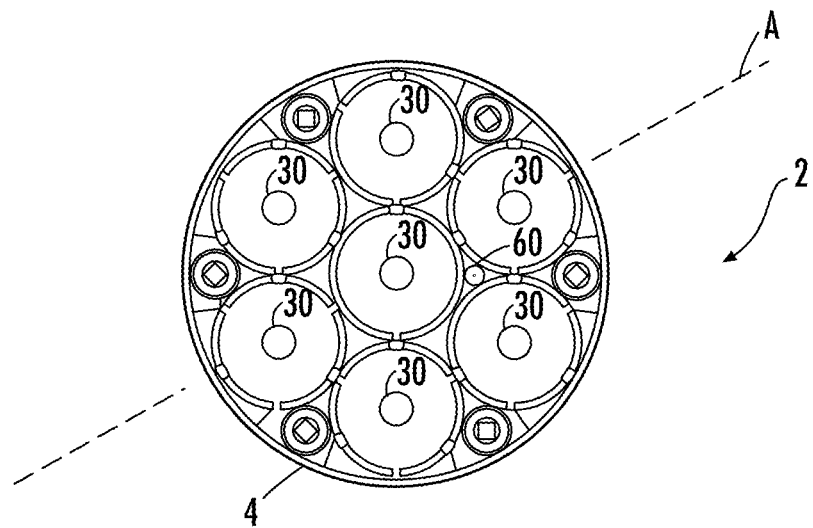
FIG. 4A-FIG. 4B show an implementation of an exterior helicopter light unit in accordance with an exemplary embodiment of the invention in a schematic view.

FIG. 4a shows an illustrative implementation of an exterior helicopter light unit 2 in accordance with an exemplary embodiment of the invention in a schematic top view. The exterior helicopter light unit 2 has a cylindrical housing 4, whose upper edge is shown as a circle in the top view of FIG. 4a.

Arranged within the housing, there are provided seven LEDs 30. It is pointed out that the implementation of FIG. 4a with seven LEDs 30 is for illustrative purposes. While it is possible to construct an exterior helicopter light unit 2 in accordance with an exemplary embodiment of the invention with seven LEDs, it is pointed out that many implementations will have a much larger number of LEDs. However, the working principles of individual LEDs contributing to the output light intensity distribution of the exterior helicopter light unit in LED-specific output direction regions can be nicely illustrated with the help of the small number of LEDs of FIG. 4.

Each of the LEDs 30 has an optical sub-system associated therewith, as will be explained below with respect to FIG. 4b. The optical sub-systems jointly form an optical system for shaping the output light intensity distribution of the exterior helicopter light unit 2. The respective combinations of the LEDs and the optical sub-systems are also cylindrical in shape. They have such a size that the arrangement of six of these seven combinations around one of these seven combinations fills the housing 4 in such a manner that the seven combinations touch each other and are packed tightly into the housing 4. The exterior helicopter light unit 2 further comprises a distance sensor 60 that is arranged between three of LEDs 30.

Figure 4B:
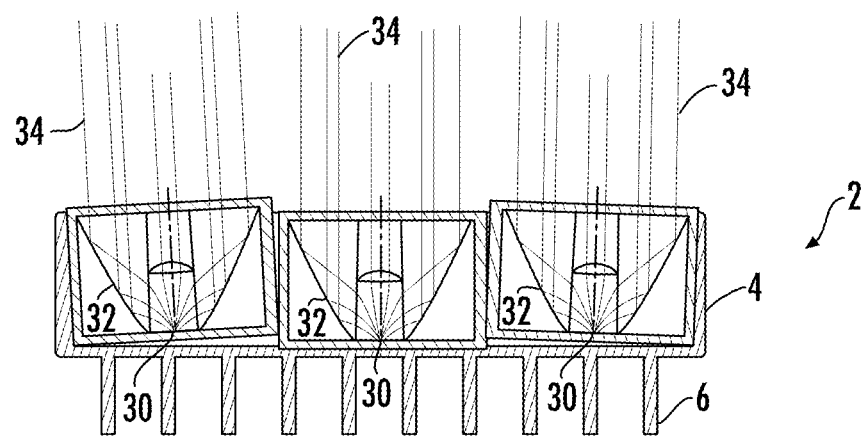

The exterior helicopter light unit 2 of FIG. 4a is shown in a cross-sectional view in FIG. 4b. The cross-sectional plane of FIG. 4b is along line A, depicted in FIG. 4a. The cross-sectional view of FIG. 4b shows the straight extension (in the top/bottom dimension) of the cylindrical wall of the housing 4. The exterior helicopter light unit 2 has a light emission side, depicted as the top side in the viewing plane of FIG. 4b, and a heat discharge side, depicted as the bottom side in the viewing plane of FIG. 4b. On said heat discharge side, the housing 4 is equipped with a cooling rib structure 6, which forms a heat sink for the LEDs arranged within the housing 4. When mounted to a helicopter, the light emission side is oriented towards the front in the helicopter longitudinal extension, such that the exterior helicopter light unit 2 can be used as a helicopter headlamp.

In the cross-sectional view of FIG. 4b, three LEDs 30 are shown. Each of the LEDs is associated with an optical sub-system. The optical sub-systems jointly form an optical system 32. For illustrative purposes, each optical sub-system is also provided with reference numeral 32. Each optical sub-system comprises a collimating lens and a collimating reflector. As illustrated by the exemplary light rays 34, each of the optical sub-systems achieves a fairly good collimation of the light from the associated LED 30.

In the viewing direction of FIG. 4b, the light from the center LED 30 is emitted straight towards the top. While the LEDs 30, depicted towards the left and right of the center LED, and their optical sub-systems are identical to the center LED and its optical sub-system, the light output direction of the light stemming from those LEDs is different. This is because the left and right LEDs 30 and their associated optical sub-systems are inclined as compared to the center LED 30 and its optical sub-system. In this way, each of the LEDs 30 contributes to the output light intensity distribution of the exterior helicopter light unit 2 in a different, LED-specific manner. Each of the LEDs 30 contributes to the output light intensity distribution in an LED-specific output direction region. Via the individual dimming of the LEDs 30, the overall output light intensity distribution of the exterior helicopter light unit 2 may be adapted in a dynamic manner.

Figure 5A:
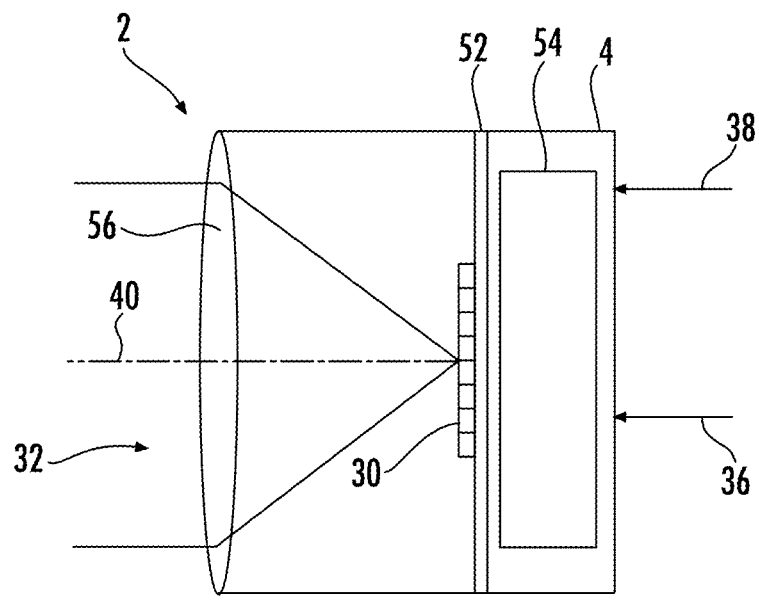
FIG. 5A-FIG. 5B show an implementation of an exterior helicopter light unit in accordance with another exemplary embodiment of the invention in a schematic view.

FIG. 5a shows a schematic illustration of an exterior helicopter light unit 2 in accordance with another exemplary embodiment of the invention. The exterior helicopter light unit 2 comprises a housing 4, whose inner space is separated into two parts by a mounting plate 52. Attached to the mounting plate 52, there is provided a plurality of LEDs 30. The plurality of LEDs 30 comprises a two-dimensional array of LEDs, one row of which is shown in the schematic illustration of FIG. 5a. The depicted row consists of eight individual LEDs arranged in a linear configuration in the exemplary embodiment. The exterior helicopter light unit 2 further comprises an optical system 32. In the exemplary embodiment of FIG. 5a, the optical system 32 consists of a lens 56. In operation, the LEDs of the plurality of LEDs 30 emit light towards the lens 56 of the optical system 32, with some or all of the plurality of LEDs 30 being dimmed in certain operating conditions, as explained above.

On the other side of the mounting plate 52, there is provided a control unit 54. The control unit 54 is coupled to a power input 36 and to a height signal input 38. In this way, the control unit 54 receives power from an external power source, such as the helicopter power network, via the power input 36. It further receives a height signal via the height signal input 38, the height signal containing data that directly indicates or lets the control unit 54 deduce the height of the exterior helicopter light unit 2 above ground. The height signal is provided to the exterior helicopter light unit 2 by a helicopter board computer in the exemplary embodiment of FIG. 5a. It is also possible that the exterior helicopter light unit 2 comprises a height sensor, which may be disposed in the housing 4. The height sensor may sense the height of the exterior helicopter light unit 2 above ground. It is also possible that the exterior helicopter light unit 2 comprises a distance sensor or receives distance information from an external source, with the distance sensor or the received distance information indicating the distance to ground for various directions from the exterior helicopter light unit 2.

The control unit 54 is further coupled to the plurality of LEDs 30 and controls a level of dimming for each of the plurality of LEDs 30 individually. In particular, the control unit 54 is configured to select the level of dimming for each of the plurality of LEDs 30 depending on the distance to ground in the respective LED-specific output direction region.

Figure 5B:
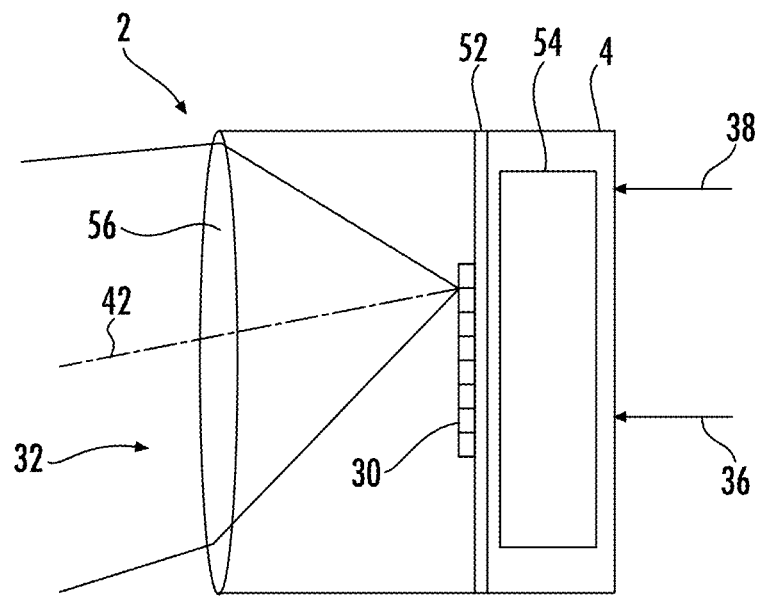

In FIGS. 5a and 5b, it is illustrated how different LEDs contribute to the output light intensity distribution in different LED-specific output direction regions. While it is understood that the LEDs are operated at the same time, with individual LEDs potentially having different levels of dimming, FIGS. 5a and 5b show the light rays of different LEDs individually for illustrative purposes. In FIG. 5a, it is illustrated that the center LEDs of the shown portion of the plurality of LEDs emit light that is directed towards the left in the viewing direction of FIG. 5a. As can be seen from the depicted exemplary light rays, the lens 56 substantially collimates the light emitted by the LEDs and outputs said light in the output direction 40. In FIG. 5b, it is illustrated that the top two LEDs of the plurality of LEDs 30 emit light that results in light output that is angled somewhat towards the bottom in the drawing plane of FIG. 5b. The output direction 42, as depicted by exemplary light rays, is slightly angled towards the bottom in the drawing plane of FIG. 5b.

From the comparison of FIG. 5a and FIG. 5b, it can be seen that each of the plurality of LEDs 30 has a different contribution to the overall output light intensity distribution of the exterior helicopter light unit 2. In particular, each of the plurality of LEDs 30 contributes in an LED-specific output direction region. It is pointed out that the light output from the plurality of LEDs 30 is shaped into the output light intensity distribution of the exterior helicopter light unit 2 by an optical system 32, having a single optical element, in the exemplary embodiment of FIG. 5. This is quite different from the embodiment of FIG. 4, where each LED is associated with an individual optical sub-system. It is pointed out that hybrid systems are possible as well, where sub-sets of the plurality of LEDs are jointly associated with an optical sub-system per sub-set.

Figure 6A:
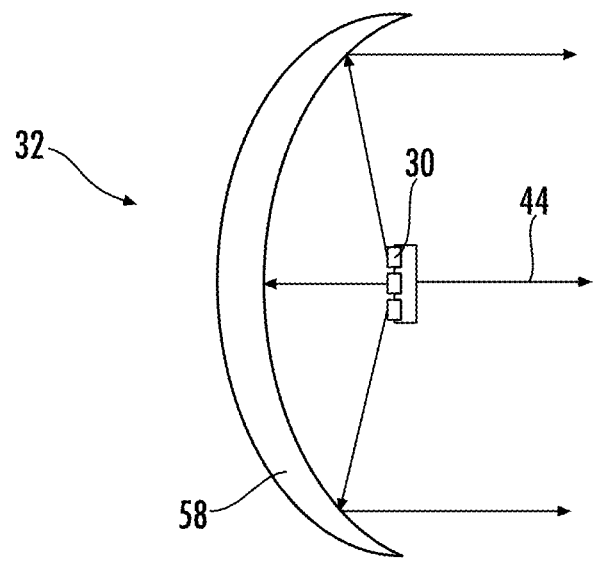
FIG. 6A-FIG. 6C show a combination of a plurality of LEDs and an optical system to be used in an exterior helicopter light unit in accordance with another exemplary embodiment of the invention in a schematic view.
Figure 6B:
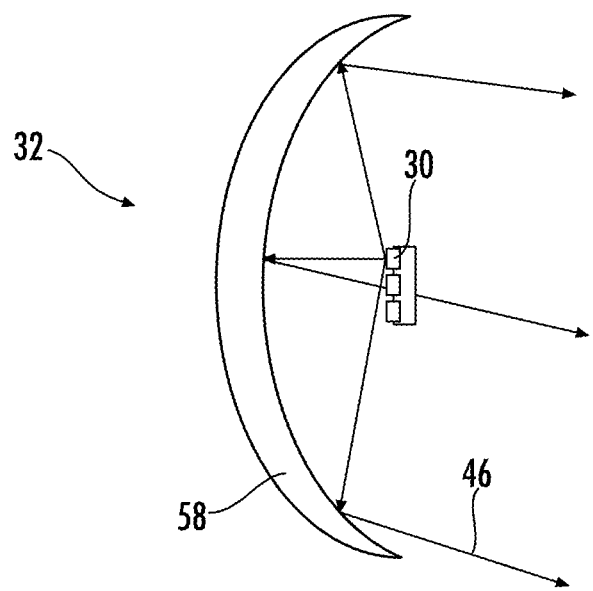
Figure 6C:
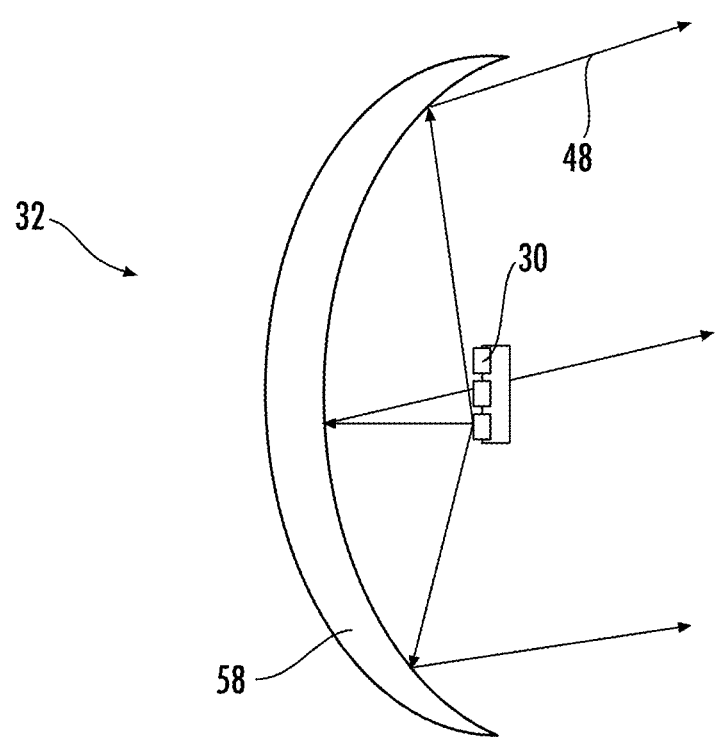

FIG. 6 shows a schematic illustration of an alternative combination of an optical system 32 and a plurality of LEDs 30. With this alternative set-up, it is also possible that each LED contributes to the overall output light intensity distribution in an LED-specific output direction region. In FIG. 6, the optical system consists of a reflector 58, which is a collimating parabolic reflector in the exemplary embodiment of FIG. 6. The center LED of the plurality of LEDs 30 is arranged in the focal point of the reflector 58, leading to a collimated light output in a direction 44 as the result of the center LED being operated. The top and bottom LEDs of the plurality of LEDs 30 are arranged at a distance from the focal point of the reflector 58, such that the top LED or the bottom LED provides for a light output that is angled towards the bottom (around a direction 46 in FIG. 6b) or angled towards the top (around a direction 48 in FIG. 6c). Again, it can be seen that the selective dimming of different LEDs of the plurality of LEDs leads to different contributions to the overall output light intensity distribution of the exterior helicopter light unit 2. It is again stressed that the plurality of LEDs are operated at the same time, with individual LEDs potentially having different levels of dimming, and that FIGS. 6a, 6b and 6c show the light rays of different LEDs individually for illustrative purposes.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior helicopter light unit with a dynamic output light intensity distribution, comprising:
a plurality of LEDs, and
an optical system for shaping the output light intensity distribution from light emitted by the plurality of LEDs, wherein each of the plurality of LEDs contributes to the output light intensity distribution in an LED-specific output direction region,
wherein at least a portion of the plurality of LEDs are individually dimmable, with a level of dimming for each of said portion of the plurality of LEDs in operation being set depending on a distance of the exterior helicopter light unit to ground in the respective LED-specific output direction region; and
wherein the exterior helicopter light unit is configured to operate each of said portion of the plurality of LEDs with a dimmed light intensity when the distance of the exterior helicopter light unit to ground in the respective LED-specific output direction region is below a predetermined threshold distance, wherein the predetermined threshold distance is between 10 meters and 30 meters.

2. An exterior helicopter light unit according to claim 1, configured to set the dimmed light intensity as a function of a nominal light intensity and the distance of the exterior helicopter light unit to ground in the respective LED-specific output direction region.

3. An exterior helicopter light unit according to claim 2, wherein the dimmed light intensity $I_{dim}$ is between $0.8*(I_{nom}*(d/d_{th})^2)$ and $1.2*(d/d_{th})^2)$, in particular between $0.9*(I_{nom}*(d/d_{th})^2)$ and $1.1*(I_{nom}*(d/d_{th})^2)$, more in particular at $(I_{nom}*(d/d_{th})^2)$, with $I_{nom}$ denoting the nominal light intensity and d denoting the distance of the exterior helicopter light unit to ground in the respective LED-specific output direction region.

4. An exterior helicopter light unit according to claim 1, configured to operate each of the plurality of LEDs with a nominal light intensity when the distance of the exterior helicopter light unit to ground in the respective LED-specific output direction region is above the predetermined threshold distance.

5. An exterior helicopter light unit according to claim 2, wherein the nominal light intensity is between 4 kcd and 50 kcd.

6. An exterior helicopter light unit according to claim 1, wherein the predetermined threshold distance is between 15 m and 25 m.

7. An exterior helicopter light unit according to claim 1, wherein the exterior helicopter light unit further comprises a distance sensor, configured to sense, for at least some of said portion of the plurality of LEDs, the distance of the exterior helicopter light unit to ground in the respective LED-specific output direction region, and/or
wherein the exterior helicopter light unit further comprises a signal input for receiving terrain information from an external source, such as from an external terrain radar.

8. An exterior helicopter light unit according to claim 1, configured to determine, for each of said portion of the plurality of LEDs, the distance of the exterior helicopter light unit to ground in the respective LED-specific output direction region on the basis of a height above ground of the exterior helicopter light unit and an angle ($\alpha$) between a vertical direction and the respective LED-specific output direction region.

9. An exterior helicopter light unit according to claim 1, having a total horizontal opening angle of between 250° and 300°, in particular of about 270°, and/or having a total vertical opening angle ($\gamma$) of between 80° and 120°, in particular of between 90° and 110°.

10. An exterior helicopter light unit according to claim 1, wherein each of the LED-specific output direction regions has an individual opening angle of between 5° and 10°.

11. A helicopter comprising an exterior helicopter light unit according to claim 1, arranged as a headlamp in a front portion of the helicopter.

12. A helicopter according to claim 11, wherein the exterior helicopter light unit has a total vertical opening angle ($\gamma$) of between 80° and 120°, in particular of between 90° and 110°, and wherein the exterior helicopter light unit is arranged at the helicopter in such a way that light emitted over the total vertical opening angle illuminates an area adjacent to a non-illuminated downwards region, the non-illuminated downwards region being defined by a threshold angle ($\beta$) with respect to a downwards direction from the exterior helicopter light unit, with the threshold angle ($\beta$) being between 10° and 30°.

13. A method of operating an exterior helicopter light unit with a dynamic output light intensity distribution, having a plurality of LEDs and an optical system for shaping the output light intensity distribution from light emitted by the plurality of LEDs, wherein each of the plurality of LEDs contributes to the output light intensity distribution in an LED-specific output direction region, the method comprising the steps of:
determining, for each of at least a portion of the plurality of LEDs, a distance of the exterior helicopter light unit to ground in the respective LED-specific output direction region,
setting, for each of said portion of the plurality of LEDs, a level of dimming depending on the distance of the exterior helicopter light unit to ground in the respective LED-specific output direction region, wherein a dimmed light intensity is set when the distance of the exterior helicopter light unit to ground in the respective LED-specific output direction is below a predetermined threshold distance, wherein the predetermined threshold distance is between 10 meters and 30 meters; and
operating each of said portion of the plurality of LEDs in accordance with the respective level of dimming.

14. A method according to claim 13, wherein the level of dimming of each of said portion of the plurality of LEDs is set in such a way that a helicopter environment is illuminated in a substantially uniform manner.

* * * * *